(No Model.)

A. L. CLARK.
IMPLEMENT FOR REMOVING CURBS OR TUBES FROM THE GROUND.

No. 533,162. Patented Jan. 29, 1895.

Witnesses:
L. C. Hills.
Chas. J. Peckham

Inventor
A. L. Clark
By Glascock & Co
Attorneys

United States Patent Office.

ALLEN LONG CLARK, OF JACKSON, TENNESSEE.

IMPLEMENT FOR REMOVING CURBS OR TUBES FROM THE GROUND.

SPECIFICATION forming part of Letters Patent No. 533,162, dated January 29, 1895.

Application filed May 29, 1894. Serial No. 612,833. (No model.)

*To all whom it may concern:*

Be it known that I, ALLEN LONG CLARK, a citizen of the United States, residing at Jackson, in the county of Madison and State of Tennessee, have invented certain new and useful Improvements in Implements for Removing Curbs or Tubes from the Ground; and I do hereby declare the following to be a full, clear, and exact description of the invention, such as will enable others skilled in the art to which it appertains to make and use the same.

My invention has relation to implements for removing curbs or tubes from Artesian wells, &c., and it consists in the novel arrangement and construction of its parts.

Figure 1:
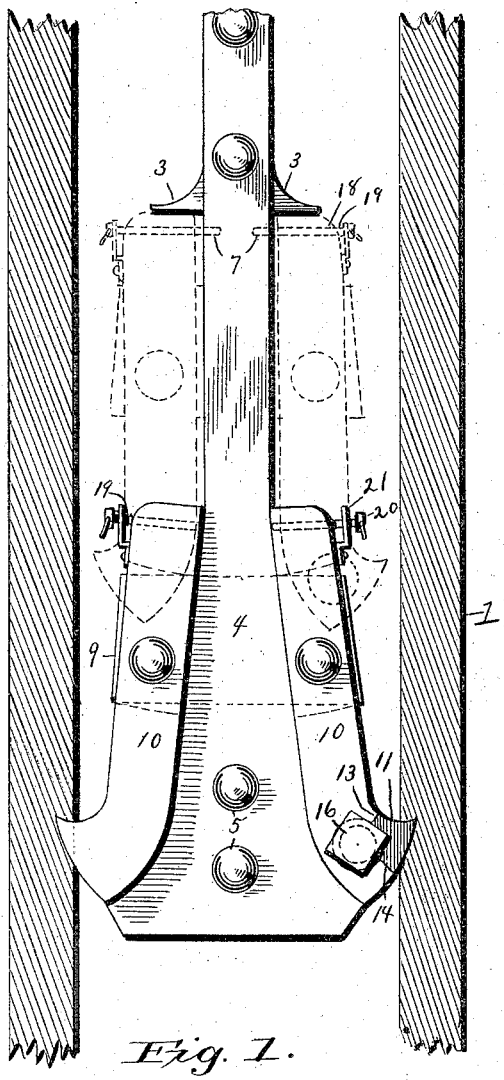
Figure 2:
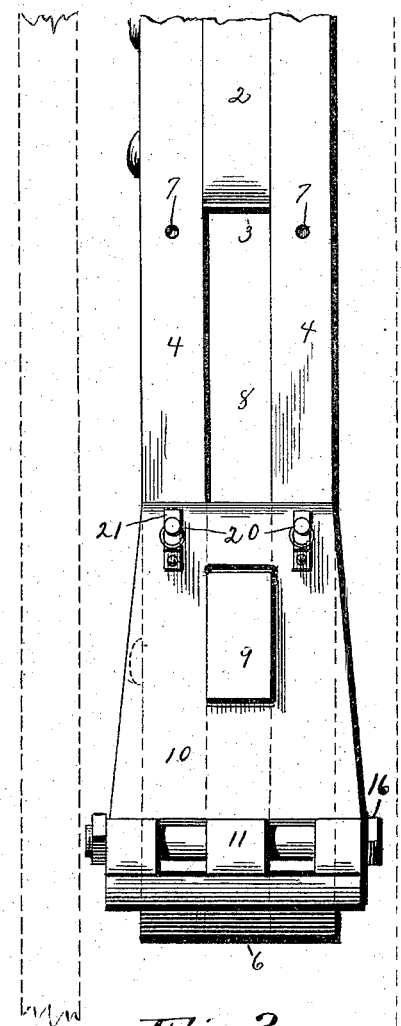
Figure 3:
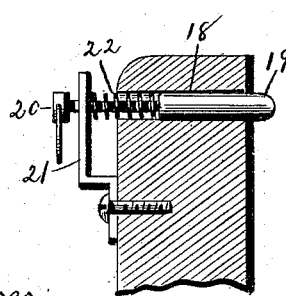
Figure 4:
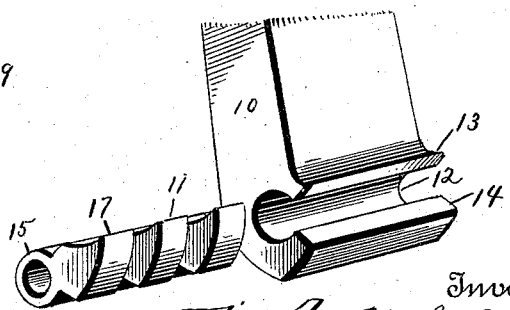

In the accompanying drawings:—Figure 1, represents a side view of the implement secured in the tube or curb. Fig. 2, represents an edge view of the implement. Figs. 3, and 4, are detail views of different parts, which will be explained hereinafter.

The curb or tube 1, may be constructed of wood or metal, and it is located in the ground. The implement consists of a rod, 2, the lower end of which is provided with the flanges 3, 3, which form a heel. The side pieces 4, 4, are secured one on each side to the rod 2. The lower ends of said side pieces 4, 4, are wedge shaped as shown in Fig. 1, and the two said pieces 4, 4, are secured together by the bolts 5, which pass therethrough and also through the interposed blocks 6. (See Fig. 2.) The upper edges of said pieces 4, 4, are provided with the indentations 7, 7. In the space 8, between the two said side pieces 4, 4, and the end of rod 2, and block 6, is located a cross piece 9; to each end of which is pivoted a tooth 10, 10. Said cross piece 9, is adapted to pass up and down in said space. The contour of the inner surfaces of the teeth 10, 10 coincide with the surfaces of the wedge shape pieces 4, 4. Said teeth may be provided with the removable points 11, as shown in Figs. 1, 2, and 4. The tooth is provided with the recess 12, having the abutting flanges 13, and 14. The tooth points consist of a part 15, adapted to slip longitudinally in the recess 12. Said part 15, is perforated longitudinally. Said perforation is adapted to hold the bolt 16, which firmly retains said point in the tooth.

The points 17, 17, are integral with the part 15, and the extreme ends of said points may form a straight line or an arc of a circle. The straight line points are used when removing a rectangular curb and the circular points are used when removing a cylindrical curb. The points 17, rest firmly between the flanges 13, and 14, (see Fig. 1) and are securely braced thereby.

The upper ends of each tooth 10, is provided with a perforation 18, in which is located a spring actuated bolt 19. The bolt consists of the enlarged part and the smaller part (as shown in detail in Fig. 3), and the head 20, provided with a ring as shown. The smaller part of the bolt 19, passes through the perforation of a lug 21, attached to the tooth and a coil spring 22, surrounds the said smaller part of said bolt and bears against the larger part of the bolt and the inner side of the lug 21.

The implement is operated as follows:—The tube to be removed is in the ground. The implement with the teeth 10, 10, resting at the lowest possible point is lowered into the tube, or curb. When the implement is lowered to the proper distance the rod 2, is pulled up, the consequence of which is that the points of the said teeth 10, 10, are forced into the sides of the tube by the wedge shape pieces 4, 4. Thus the implement is secured to the tube and by raising the implement the tube is raised also. In order to disengage the teeth 10, 10, from the sides of the tube the rod 2, is suddenly lowered and the heel 3, will strike the upper ends of the teeth and thereby disengage them from the sides of the tube. At the same time the spring actuated bolts 19, 19, will enter the indentations 7, 7, and the said teeth are thereby held up against the narrow part of the pieces 4, 4 (see dotted lines Fig. 1), and thus the implement can be removed from the tube.

Having described my invention, what I claim as new, and desire to secure by Letters Patent, is—

1. An implement for removing hollow tubes, &c., from the ground, consisting of a rod; wedge shaped pieces secured one to each side of said rod; a connection extending between the lower ends of said pieces; a cross piece located in the space between the lower end of the rod the inner sides of the wedge shaped pieces and their connection; suitable teeth pivoted to said cross piece adapted to engage at their lower ends the sides of the tube, as set forth.

2. An implement for removing hollow tubes, &c., from the ground; consisting of a rod; the wedge shape pieces secured one to each side of said rod and having suitable indentations; a connection extending between the lower ends of said pieces; a cross piece located in the space between the lower end of the rod the inner sides of the wedge shaped pieces and their connection; suitable teeth pivoted to said cross piece adapted to engage at their lower ends the sides of the tube; the spring actuated bolts adapted to enter the indentations in the wedge shape pieces and thereby hold the said teeth up, as set forth.

3. A device for removing tubes, &c., located in the ground, consisting of a rod provided with wedge shape pieces; a tooth connected to the rod and having a recess provided with a flange at each edge thereof and adapted to be forced out by the wedge shape pieces; and removable points adapted to rest in said recess and against said flanges, as set forth.

In testimony whereof I affix my signature in presence of two witnesses.

ALLEN LONG CLARK.

Witnesses:
   JNO. T. STARK,
   HU. C. ANDERSON.